United States Patent Office 3,795,681
Patented Mar. 5, 1974

3,795,681
AMINOTHIOPHENE-CARBOXYLIC ACID ESTERS
Heinrich Ruschig, Bad Soden, Taunus, Willi Meixner, Hofheim, Taunus, and Hans Georg Alpermann, Schneidhain, Taunus, Germany, assignors to Farbwerke Hoechst Aktiengesellschaft vormals Meister Lucius & Bruning, Frankfurt am Main, Germany
No Drawing. Filed May 26, 1972, Ser. No. 257,180
Claims priority, application Germany, May 28, 1971, P 21 26 597.4
Int. Cl. A61k 27/00; C07d 63/16
U.S. Cl. 260—332.2 C     12 Claims

ABSTRACT OF THE DISCLOSURE

Novel aminothiophene-carboxylic acid esters are described as well as a process for their manufacture and their antiphlogistic and antipyretic action. The novel compounds correspond to the Formula I $$R-NH-\underset{R_1}{\overset{}{\underset{S}{\bigsqcup}}}-R_2 \overset{O}{\underset{}{\parallel}}-O-\underset{R_3}{\overset{}{\underset{}{C}H}}-O-\overset{O}{\underset{}{\parallel}}-R_4 \quad (I)$$

wherein R represents phenyl which may carry 1, 2 or 3 substituents selected from halogen, trifluoromethyl, low molecular alkyl and alkoxy, aralkoxy being low molecular in the alkylene moiety, and cycloalkyl having 5–6 members, and wherein two vicinal substituents may be members of a condensed alicyclic ring system, and wherein $R_1$ and $R_2$ each represents hydrogen or low molecular alkyl, $R_3$ represents hydrogen or low molecular alkyl and $R_4$ represents alkyl or aryl in which case the aryl group may contain 1 or 2 hetero atoms, such as nitrogen, oxygen or sulfur.

---

The present invention relates to aminothiophene-carboxylic acid esters having an antiphlogistic and antipyretic action and a process for their preparation.

Aminothiophene derivatives having antiphlogistic and antipyretic properties have been described in British Pat. No. 1,133,850.

This invention relates to aminothiophene-carboxylic acid esters of the Formula I $$R-NH-\underset{R_1}{\overset{}{\underset{S}{\bigsqcup}}}-R_2 \overset{O}{\underset{}{\parallel}}-O-\underset{R_3}{\overset{}{\underset{}{C}H}}-O-\overset{O}{\underset{}{\parallel}}-R_4 \quad (I)$$

wherein R represents phenyl which may carry 1, 2 or 3 substituents selected from halogen, trifluoromethyl, low molecular alkyl and alkoxy, aralkoxy being low molecular in the alkylene moiety, and cycloalkyl having 5–6 members, and wherein two vicinal substituents may be members of a condensed alicyclic ring system, and wherein $R_1$ and $R_2$ each represents hydrogen or low molecular alkyl,
$R_3$ represents hydrogen or low molecular alkyl, and
$R_4$ represents alkyl or aryl in which case the aryl group may contain 1 or 2 hetero atoms, such as nitrogen, oxygen or sulfur.

Aminothiophene-carboxylic acid esters of the Formula I are preferred wherein R represents a phenyl radical which may carry 1, 2 or 3 substituents selected from the group consisting of fluorine, chlorine, bromine, trifluoromethyl, alkyl having from 1 to 4 carbon atoms, methoxy, benzyloxy, cyclopentyl, cyclohexyl, butylene-(1,4) and wherein $R_1$ and $R_2$ each represents hydrogen, methyl or ethyl. The radicals $R_3$ and $R_4$ are of minor importance with respect to the action of the substances in accordance with the invention and may therefore be varied within wide limits. Thus, $R_3$ may represent, for example, hydrogen, methyl, ethyl, propyl, butyl, pentyl or hexyl and $R_4$ may represent hydrogen, alkyl having from 1–10 carbon atoms, phenyl, naphthyl, pyridyl, thienyl, furyl, in which case the cyclic radicals may be substituted by low molecular alkyl, trifluoromethyl, nitro, halogen or low molecular alkoxy.

This invention furthermore relates to a process for the preparation of an aminothiophene-carboxylic acid ester of the Formula I which comprises reacting an aminothiophene-carboxylic acid ester of the Formula II $$R-NH-\underset{R_1}{\overset{}{\underset{S}{\bigsqcup}}}-R_2 -COOH \quad (II)$$

wherein R, $R_1$ and $R_2$ are as defined above, or a salt of such an acid with an ester of the Formula III $$X-\underset{R_3}{\overset{}{\underset{}{C}HO}}CO-R_4 \quad (III)$$

wherein X stands for a halogen atom, preferably a chlorine or bromine atom, or for an alkanesulfonyloxy radical, preferably a methane or ethane-sulfonyloxy radical, or an arylsulfonyloxy radical, preferably the benzene or toluene sulfonyloxy radical or the radical of the sulfur atom and $R_3$ and $R_4$ are as defined above.

Convenient starting materials for the process in accordance with the invention are, for example, the following aminothiophene-carboxylic acid esters corresponding to the above Formula II and the salts thereof:

3-(2',3'-dimethyl-anilino)-thiopene-4-carboxylic acid
3-(2',6'-dichloro-anilino)-thiophene-4-carboxylic acid
3-(2'-chloroanilino)-thiophene-4-carboxylic acid
3-(2',6'-dichloro-3'-methyl-anilino)-thiophene-4-carboxylic acid
3-(3'-trifluoromethyl-anilino)-thiophene-4-carboxylic acid
2- or 5-methyl-3-(2',6'-dichloroanilino)-thiophene-4-carboxylic acid
2,5-dimethyl-3-(2',6'-dichloro-anilino)-thiophene-4-carboxylic acid
2-ethyl-5-methyl-3-(2'-chloro-3'-methyl)-anilino-thiophene-4-carboxylic acid
5-propyl-3-(2',4'-dichloro-5'-methyl-anilino)-thiophene-4-carboxylic acid
2-methyl-5-butyl-(2'-methyl-4',6'-dichloro-anilino)-thiophene-4-carboxylic acid
3-(2'-chloro-3'-methylanilino)-thiophene-4-carboxylic acid.

These starting materials can be obtained according to process as described in British Pat. No. 1,133,850.

Suitable esters of Formula III are, for example, the following: acetoxymethyl chloride, trimethyl-acetoxymethyl chloride, propionyloxy-methyl chloride, butyryloxymethyl chloride, 1-acetoxy-1-chloroethane, 1-acetoxy-1-chlorobutane, 1-benzoyloxy-1-chlorethane or 1 - toluyloxy-1-chlorethane, nicotinoyloxymethylbromide, furoyloxymethyl chloride, thenoyloxy-methyl chloride.

The process is advantageously carried out by reacting a salt of the aminothiophene-carboxylic acid of the Formula II, preferably an alkali metal salt, in an inert solvent, such as benzene, toluene, dioxan, glycoldimethyl ether or dimethyl formamide with an ester of the Formula III at a temperature within the range of from room temperature to the boiling temperature of the solvent used, preferably at a temperature within the range of from 40 to 80° C., advantageously while stirring. After having separated the solvent by distillation the residue is taken up with water and an organic solvent and the reaction product is isolated from the organic solvent.

The aminothiophene-carboxylic acid esters are in some cases obtained as crystalline substances and can be purified by the habitual methods, such as recrystallization or distillation under highly reduced pressure.

The aminothiophene-carboxylic acid esters pertaining to the above-mentioned invention possess strong anti-inflammatory and antipyretic properties. Thus, for example, the examination of the 3-(2'-chloro-3'-methyl-anilino)-thiophene-carboxylic acid-acetoxymethyl ester in the Aerosil test on the rat's paw (cf. Wagner-Jauregg and Jahn, Helvetica Physiologica et Pharmacologica Acta, 21 (1963), pp. 65 et seq.) upon oral administration resulted in an anti-inflammatory effect 8 to 10 times stronger than that obtained with phenyl-butazone.

The same results were obtained in the cotton-pellet-test (Meier, Schuler and Dessaulles, Experientia, 6 (Basel 1950), pp. 469 et seq.). A strong anti-inflammatory activity could also be demonstrated using the UV-erythema test in guinea pigs (cf. Winder et al., Archives Internationales de Pharmacodynamie et de Thérapie, 116 (1958), pp. 261 et seq.).

3-(2'-chloro -3' - methyl-anilino)-thiophene-carboxylic acid-acetoxy-methyl ester has considerably higher antipyretic activity in comparison to known compounds. Thus, according to the method of Bavin et al. (cf. Journal of Pharmacy and Pharmacology 4 (1932), pp. 872 et seq.) 2.5 milligrams/kg. of the above-mentioned compound given orally to rats showed the same antipyretic activity as 16 milligrams/kg. of phenylbutazone. The compound pertaining to the invention acted as an analgesic (cf. phenylquinone-writhing test, by the method described by Hendershot and Forsaith, Journal of Pharmacology and Experimental Therapeutics, 125 (1959), pp. 237 et seq.). The activity in this test is 10 times stronger than that obtained with phenylbutazone or aminophenazone.

The acute toxicity of the compounds in accordance with the invention is low and it lies in the same range or is even less than the toxicity of the known compounds mentioned.

The aminothiophene-carboxylic acid esters of the invention can, therefore, be used as antiphlogistics, antipyretics and analgesics.

They are tasteless and can be further worked, optionally in admixture with other active substances, in the form of the usual galenic preparations with the habitually used excipients, solvents or constituents. For oral and rectal administration, tablets, capsules and dragées or suppositories are preferably used. Injection in physiologically tolerable solvents and the local administration in the form of solutions, ointments or powders are also possible.

The following examples illustrate the invention.

EXAMPLES (1) 3-(2'-chloro - 3' - methylanilino)-thiophene-4-carboxylic acid - acetoxy-methyl ester.—26.8 g. of 3-(2'-chloro-3'-methylanilino)-thiophene - 4 - carboxylic acid were heated at 60° C. in 250 ml. of dimethyl formamide in the presence of 14 g. of potassium carbonate. 15 g. of chloromethyl acetate were added to the mixture and stirred at 60° C. for 1 hour. The reaction mixture was vaporized and the residue was taken up in trichloromethane and water. After washing with water, drying with sodium sulfate and vaporization the acetoxymethyl ester was obtained from the organic phase which was purified by recrystallization from diisopropyl ether.
Yield: 21.2 g.
Melting point: 80° C.
Boiling point: 205–208° C. under a pressure of 0.1 mm. mercury.

In an analogous manner, the following compounds were obtained.

(2) 3-(2'-chloro-3'-methylanilino)-thiophene - 4 - carboxylic acid-trimethyl-acetoxymethyl ester; boiling point: 205–207° C. under a pressure of 0.1 mm. mercury.

(3) 3-(2'-chloro-3'-methylanilino)-thiophene - 4 - carboxylic acid-butyryloxy - methylester; melting point: 65° C.

(4) 3-(3',5'-bis-trifluoromethyl) - anilino - thiophene-4-carboxylic acid-acetoxymethylester; melting point: 93° C.

(5) 3-(2',6'-dichloroanilino)-thiophene - 4 - carboxylic acid-acetoxy-methyl ester; melting point: 59° C.

(6) 3-(2'-chloro-5'-trifluoromethylanilino)-thiophene-4-carboxylic acid-acetoxymethyl ester; melting point 101° C.

(7) 3-(2'-chloro-3'-methylanilino)-thiophene - 4 - carboxylic acid-α-(p-chlorobenzoyloxy)ethyl ester; melting point: 107° C.

We claim:
1. An aminothiophene-carboxylic acid ester of the formula

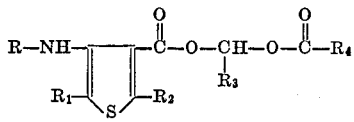

wherein R represents phenyl substituted by from 1 to 3 substituents selected from the group consisting of halogen, trifluoromethyl, lower alkyl, lower alkoxy, benzyloxy and cycloalkyl of 5 to 6 carbon atoms and 1,4-butylene substituted on vicinal carbon atoms, $R_1$ and $R_2$ represent hydrogen or lower alkyl, $R_3$ represents hydrogen or alkyl of 1 to 6 carbon atoms, and $R_4$ represents hydrogen, alkyl of 1 to 10 carbon atoms, phenyl, naphthyl, pyridyl, thienyl, furyl or phenyl substituted by lower alkyl, trifluoromethyl, nitro, halogen or lower alkoxy.

2. An aminothiophene-carboxylic acid ester as defined in claim 1 wherein R represents phenyl substituted by from 1 to 3 substituents selected from the group consisting of chlorine, trifluoromethyl and methyl.

3. An aminothiophene-carboxylic acid ester as defined in claim 1 wherein $R_1$ and $R_2$ are hydrogen, methyl, ethyl, propyl or butyl.

4. An aminothiophene-carboxylic acid ester as defined in claim 1 wherein $R_3$ is hydrogen, methyl, ethyl or propyl.

5. An aminothiophene-carboxylic acid ester as defined in claim 1 wherein $R_4$ is hydrogen, methyl, ethyl, propyl, isobutyl, phenyl, tolyl, chlorophenyl, pyridyl, thienyl or furyl.

6. The compound defined in claim 1 wherein R is 2'-chloro-3'-methylphenyl, $R_1$, $R_2$ and $R_3$ are hydrogen, and $R_4$ is methyl.

7. The compound defined in claim 1 wherein R is 2'-chloro-3'-methylphenyl, $R_1$, $R_2$ and $R_3$ are hydrogen, and $R_4$ is —$C(CH_3)_3$.

8. The compound defined in claim 1 wherein R is 2'-chloro-3'-methylphenyl, $R_1$, $R_2$ and $R_3$ are hydrogen, and $R_4$ is $C_3H_9$.

9. The compound defined in claim 1 wherein R is 3',5'-bis-trifluoromethylphenyl, $R_1$, $R_2$ and $R_3$ are hydrogen and $R_4$ is methyl.

10. The compound defined in claim 1 wherein R is 2',6'-dichlorophenyl, $R_1$, $R_2$ and $R_3$ are hydrogen, and $R_4$ is methyl.

11. The compound defined in claim 1 wherein R is 2'-chloro-5'-trifluoromethylphenyl, $R_1$, $R_2$ and $R_3$ are hydrogen, and $R_4$ is methyl.

12. The compound defined in claim 1 wherein R is 2'-chloro-3'-methylphenyl, $R_1$ and $R_2$ are hydrogen, $R_3$ is methyl and $R_4$ is p-chlorophenyl.

References Cited
UNITED STATES PATENTS
3,445,473   5/1969   Ruschig et al. _____ 260—293.4

HENRY R. JILES, Primary Examiner
C. M. S. JAISLE, Assistant Examiner

U.S. Cl. X.R.
260—294.8 D; 424—266, 275